UNITED STATES PATENT OFFICE.

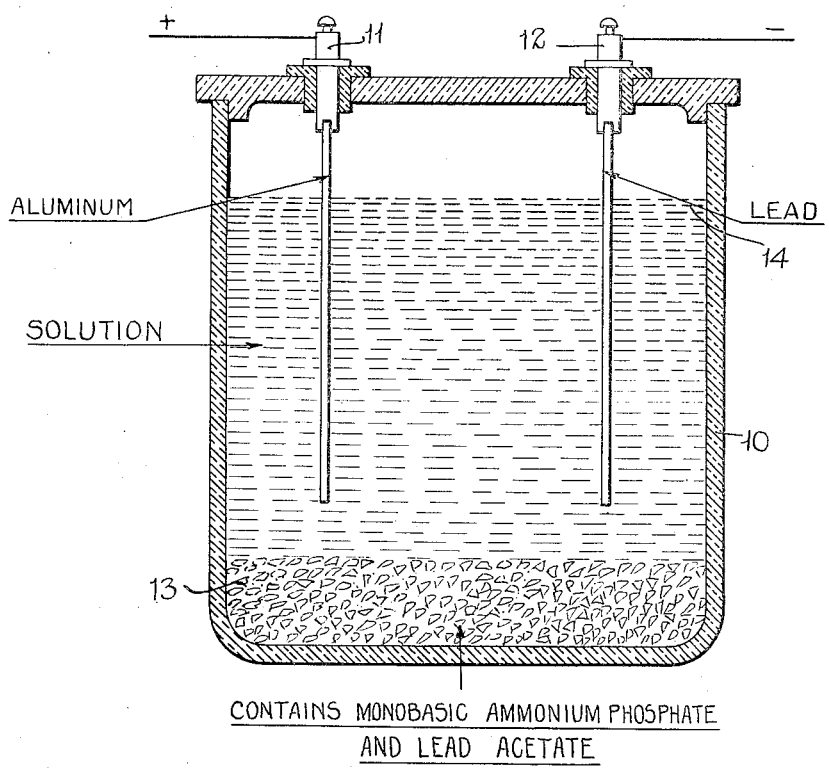

FRANKLIN H. MACKENZIE, OF PHILADELPHIA, PENNSYLVANIA, ASSIGNOR OF ONE-HALF TO MUNSON H. LANE, OF WASHINGTON, DISTRICT OF COLUMBIA.

RECTIFIER COMPOUND.

Application filed April 12, 1926. Serial No. 101,575.

The invention relates to electrolytic rectifiers and more particularly to a composition of matter for use as an electrolyte in an electrolytic rectifier cell. The invention may be more readily understood by reference to the accompanying drawing, which is a diagrammatic sectional view of a cell illustrating my invention.

The rectifier cell 10 which I employ may be of ordinary construction, and is preferably provided with an aluminum positive electrode 11 and a lead negative electrode 12.

My improved composition consists preferably of a mixture of monobasic ammonium phosphate and lead acetate or sugar of lead in about the proportions of three (3) parts by weight of the ammonium phosphate to one (1) of the lead acetate. These proportions may be varied somewhat, but for best results they should be maintained approximately. The above ingredients are preferably mixed dry and placed in the bottom of the rectifier cell as at 13, which is then filled with water to the level 14. The composition does not completely dissolve in the water at once, but sufficient reaction takes place to supply a substantially constant voltage when the rectifier is in operation. The electrodes should extend a substantial distance into the electrolytic solution but should not extend into the undissolved compound at the bottom of the cell.

I am aware that ammonium phosphate has been used in rectifier cells, but I find that with the addition of the lead acetate in about the proportions specified I am able to secure the advantages of greater voltage, quicker action, more constant flow of current and longer life than with any compound previously known to me.

While I prefer monobasic ammonium phosphate and lead acetate, it is obvious that equivalents may be employed, as for example, ammonium acetate and lead phosphate.

What I claim is:—

1. An electrolyte for use in electrolytic rectifiers comprising an aqueous solution of ammonium phosphate and lead acetate.

2. An electrolytic cell having a positive electrode of aluminum and a negative electrode of lead, submerged in an aqueous solution of lead acetate and ammonium phosphate.

3. An electrolyte for use in electrolytic rectifiers containing monobasic ammonium phosphate and lead acetate.

4. An electrolyte for use in electrolytic rectifiers containing the ammonium, phosphate, lead and acetate radicals.

5. An electrolyte for use in electrolytic rectifiers comprising an aqueous solution of monobasic ammonium phosphate and lead acetate in substantially the proportions of three parts of the former to one part of the latter.

In testimony whereof I affix my signature.

FRANKLIN H. MACKENZIE.